US010012776B2

(12) United States Patent
Travis

(10) Patent No.: US 10,012,776 B2
(45) Date of Patent: Jul. 3, 2018

(54) OPTICAL FILTERS, METHODS OF MANUFACTURE, AND METHODS OF USE

(71) Applicant: Microsoft Technology Licensing, LLC, Redmond, WA (US)

(72) Inventor: Adrian Travis, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 21 days.

(21) Appl. No.: 14/949,419

(22) Filed: Nov. 23, 2015

(65) Prior Publication Data

US 2017/0146712 A1 May 25, 2017

(51) Int. Cl.
*G02B 5/18* (2006.01)
*G02B 5/28* (2006.01)
*B29D 11/00* (2006.01)
*G02B 1/04* (2006.01)
*B65H 45/12* (2006.01)
(Continued)

(52) U.S. Cl.
CPC ........ *G02B 5/288* (2013.01); *B29D 11/00634* (2013.01); *B65H 45/12* (2013.01); *G02B 1/04* (2013.01); *G02B 5/18* (2013.01); *G02B 5/1852* (2013.01); *G02B 5/1861* (2013.01); *G02B 27/0172* (2013.01); *G02B 27/22* (2013.01); *G02B 27/225* (2013.01); *B29K 2995/0026* (2013.01); *B65H 45/30* (2013.01); *G02B 2027/0194* (2013.01)

(58) Field of Classification Search
CPC .................................. G02B 5/201; F21V 1/06
USPC ................ 359/586, 572, 871, 576; 362/352; 430/7; 349/113
See application file for complete search history.

(56) References Cited

U.S. PATENT DOCUMENTS 2,907,041 A * 10/1959 Finn ........................ A61F 9/025
2/432
5,598,650 A 2/1997 Brown
(Continued)

FOREIGN PATENT DOCUMENTS

CN 101621179 A 1/2010
CN 101975638 B 1/2012
(Continued)

OTHER PUBLICATIONS

"Optical Spectral Filters and Gratings", Retrieved on: Aug. 18, 2015, Available at: http://ftp.utcluj.ro/pub/users/cemil/dwdm/dwdm_Intro/4_5311739.pdf.
(Continued)

*Primary Examiner* — Audrey Y Chang
(74) *Attorney, Agent, or Firm* — Ray Quinney & Nebeker; Paul Taylor; Miia Sula

(57) ABSTRACT

An optical filter includes a first film having an upper surface, a lower surface, a first side, and a second side. A second film is included that has an upper surface, a lower surface, a first side, and a second side. A third film is included that has an upper surface, a lower surface, a first side, and a second side. The first side of the first film is connected to the second side of the second film. The first side of the second film is connected to the second side of the third film. The lower surface of the first film is optically adjacent to the upper surface of the second film. The lower surface of the second film is optically adjacent to the upper surface of the third film. Methods of manufacture and use are also described.

20 Claims, 8 Drawing Sheets

(51) Int. Cl.
*G02B 27/22* (2018.01)
*B65H 45/30* (2006.01)
*G02B 27/01* (2006.01)

(56) References Cited

U.S. PATENT DOCUMENTS

| | | | |
|---|---|---|---|
| 5,781,670 A | 7/1998 | Deacon et al. | |
| 6,173,516 B1 | 1/2001 | Duerrstein | |
| 6,490,931 B1 | 12/2002 | Fernald et al. | |
| 7,657,132 B1 | 2/2010 | Yap et al. | |
| 7,817,888 B2 | 10/2010 | Volodin et al. | |
| 8,165,436 B2 | 4/2012 | Mossberg et al. | |
| 8,199,406 B2 * | 6/2012 | Takenaka | G02B 5/124 349/113 |
| 8,322,895 B2 * | 12/2012 | Mateer | F21V 9/06 362/217.02 |
| 8,384,999 B1 | 2/2013 | Crosby et al. | |
| 8,989,528 B2 | 3/2015 | Udd | |
| 9,030,742 B2 * | 5/2015 | Ventola | G02B 5/1814 359/572 |
| 2004/0180275 A1 * | 9/2004 | Kim | G02B 5/201 430/7 |
| 2007/0222013 A1 | 9/2007 | Lincoln et al. | |
| 2010/0134534 A1 | 6/2010 | Seesselberg et al. | |

FOREIGN PATENT DOCUMENTS

| | | |
|---|---|---|
| CN | 103791957 A | 5/2014 |
| EP | 1724742 | 11/2006 |
| GB | 887008 | 1/1962 |
| JP | H11183746 A | 7/1999 |
| JP | 2003279760 A | 10/2003 |
| KR | 20140101078 A | 8/2014 |
| WO | 03058979 | 7/2003 |
| WO | 2012095581 | 7/2012 |
| WO | 2014070641 | 5/2014 |

OTHER PUBLICATIONS

Henschel, et al., "Influence of Manufacturing Parameters and Temperature on the Radiation Sensitivity of Fiber 2 Bragg Gratings", In Proceedings European Conference on Radiation and Its Effects on Components and Systems, Sep. 14, 2009, pp. 382-387.

Kolle, et al., "Stretch-Tuneable Dielectric Mirrors and optical Microrocavities", In Publication of Optics Express, vol. 18, Issue 5, Feb. 17, 2010, pp. 4356-4364.

Coram Showers et al: "Please a Product of the Coram Group of Companies", Jan. 27, 2015 (Jan. 27, 2015), XP055338174, Retrieved from the Internet: URL: http://www.coram.co.uk/wp-content/uploads/2015/01/00/70895/00/Multi-panel-bathscreen.pdf [retrieved on Jan. 24, 2017].

International Search Report and the Written Opinion issued in PCT application # PCT/US2016/062125 dated Feb. 7, 2017.

"Second Written Opinion Issued in PCT Application No. PCT/US2016/062125", dated Oct. 30, 2017, 8 Pages.

"International Preliminary Report on Patentability Issued in PCT Application No. PCT/US2016/062125", dated Feb. 28, 2018, 9 Pages.

* cited by examiner

OPTICAL FILTERS, METHODS OF MANUFACTURE, AND METHODS OF USE

BACKGROUND

Optical filters have been used for a number of functions. One example of an optical filter is a Bragg reflective grating. Bragg reflective gratings have been used in, for example, optical fibers. A fiber Bragg grating may be used to reflect wavelength-specific light. Bragg gratings are typically made by holography.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes an optical filter. The optical filter includes a first film having an upper surface, a lower surface, a first side, and a second side. A second film is included that has an upper surface, a lower surface, a first side, and a second side. A third film is included that has an upper surface, a lower surface, a first side, and a second side. The first side of the first film is connected to the second side of the second film. The first side of the second film is connected to the second side of the third film. The lower surface of the first film is optically adjacent to the upper surface of the second film. The lower surface of the second film is optically adjacent to the upper surface of the third film.

Another embodiment illustrated herein includes an optical filter. The optical filter includes a first film having an upper surface, a lower surface, a first side, and a second side. A second film is included that has an upper surface, a lower surface, a first side, and a second side. A third film is included that has an upper surface, a lower surface, a first side, and a second side. The first side of the first film is connected to the second side of the second film. The first side of the second film is connected to the second side of the third film. The lower surface of the first film abuts the upper surface of the second film. The lower surface of the second film abuts the upper surface of the third film. The upper surface of the first film has a first index of refraction and the lower surface of the first film has a second index of refraction. The first index of refraction is different than the second index of refraction.

A further embodiment illustrated herein includes a method of manufacturing an optical filter. The method includes plastically deforming a film from a planar configuration to a folded configuration. The film has an upper surface and a lower surface. The upper surface has a first index of refraction and the lower surface has a second index of refraction. The first index of refraction is different than the second index of refraction. The method includes transitioning the film from the folded configuration to a stacked configuration where one or more of the upper surfaces of the film abut and one or more of the lower surfaces of the film.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 1-1 is a cutaway view of the embodiment of a head worn display device shown in FIG. 1;

FIG. 2-1 is a cutaway view of the embodiment of a wearable display device shown in FIG. 2;

FIG. 3-1 is a cutaway view of the embodiment of a display device shown in FIG. 3;

FIG. 3-2 is a cutaway view of the embodiment of a display device shown in FIG. 3;

FIG. 4-1 is an isometric, planar view of an embodiment of an optical filter having three separate films in a stacked configuration;

FIG. 4-2 is an isometric view the embodiment of an optical filter shown in FIG. 4-1 in a stacked configuration;

FIG. 5-1 is an isometric view of an embodiment of an optical filter having three integrally formed films in a planar configuration;

FIG. 5-2 is an isometric view of the embodiment of an optical filter of FIG. 5-1 in a folded configuration;

DETAILED DESCRIPTION

This disclosure generally relates to optical filters, methods of manufacture, and methods of use. More particularly, this disclosure generally relates to optical filters with multiple films connected at one side.

Figure 1:
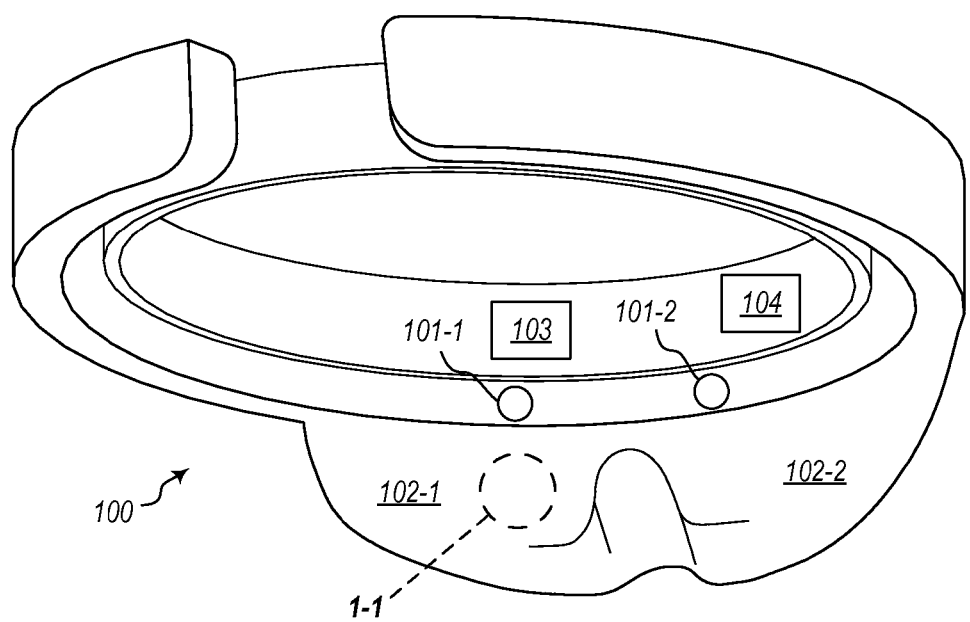
FIG. 1 is a conceptual drawing of an embodiment of a head worn display device.
Figure 1:
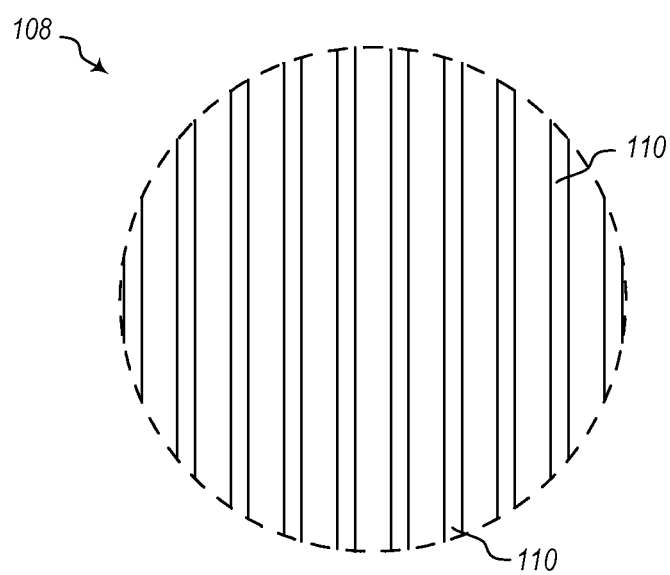

At least one embodiment of an optical filter may be used to direct and/or concentrate illumination from a display into the eyes of the viewer. Referring now to FIG. 1, a conceptual drawing of an embodiment of a head worn display device 100 is shown. The head worn display device 100 may include one or more cameras 101. A camera 101 may be used to track the location of each eye and/or pupil of the viewer wearing the head worn display device 100. For example, as the viewer's eyes move, the camera 101 may track the position of one or more of the viewer's eyes. In the illustrated embodiment, more than one camera 101 is used. For example, a first camera 101-1 may track the position of a first eye and/or a first pupil of the first eye and a second camera 101-2 may track the position of a second eye and/or a second pupil of the second eye.

The head worn display device 100 may include one or more displays 102. A display 102 may be used to emit light into one or more eyes of a viewer (not shown). In the illustrated embodiment, the head worn display device 100 may include a first display 102-1 and a second display 102-2 that may each include a light source. For example, the first display 102-1 may emit light into one eye and the second display 102-2 may emit light into the other eye. In another example, the first display 102-1 may only emit light into a first eye or the second display 102-2 may only emit light into a second eye.

The head worn display device 100 may include a processor 103, memory 104, other computing components, or combinations thereof, which may be in electronic communication with each other. The memory 104 may include instructions executable by the processor 103 to perform various functions. For example, the memory 104 may include instructions that are executable by the processor 103 to control the displays (e.g., the first display 102-1 and the second display 102-2).

As shown in FIG. 1-1, the head worn display device 100 may include at least one optical filter 108. The optical filter 108 may be used to deflect light from one or more displays (e.g., first display 102-1 and/or second display 102-2) into one or more of the viewer's eyes and/or pupils. For example, a portion of the optical filter 108 shown in FIG. 1-1 illustrates that the optical filter 108 may include one or more films 110. The films 110 may be oriented such that the films 110 are substantially parallel to a light path from a display (e.g., first display 102-1) to the viewer's eye (e.g., pupil). Thus, the films 110 may direct light from a display into the viewer's eye. In some embodiments, the films 110 may be fixed in orientation with respect to the viewer's eye. In other embodiments, one or more of the films 110 may be moveable such that as the viewer's eyes move, the orientation of the one or more films 110 may move such that the light from the display is directed into the user's eye. For example, the memory 104 may include instructions that are executable by the processor 103 to control an actuator (not shown) to change the orientation of one or more films 110.

In embodiments with two or more displays 102 and/or moveable films 110, the head worn display device 100 may project three-dimensional objects into the viewer's eyes (e.g., pupils) as the viewer's eyes move. In embodiments with a single display and/or non-moveable films 110, the head worn display device 100 may project three dimensional objects into the viewer's eyes only when the viewer's eyes are in a desired position or within a range of desired positions. For example, the films 110 may be oriented such that when the viewer's eyes are directed straight ahead or within a desired percentage of straight ahead (e.g., within a radius of 10 percent of the viewer's field of vision), the three dimensional objects may be projected to the user's eyes.

Figure 2:
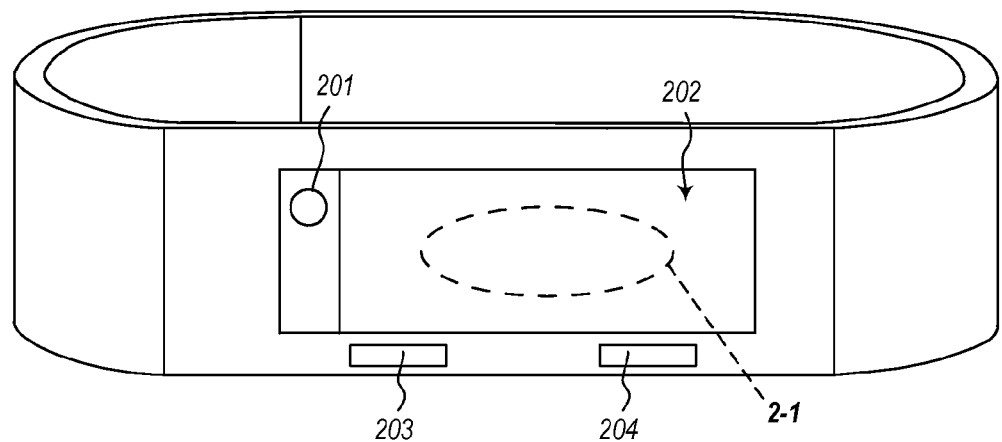
FIG. 2 is a conceptual drawing of an embodiment of a wearable display device.
Figures 1, 2:
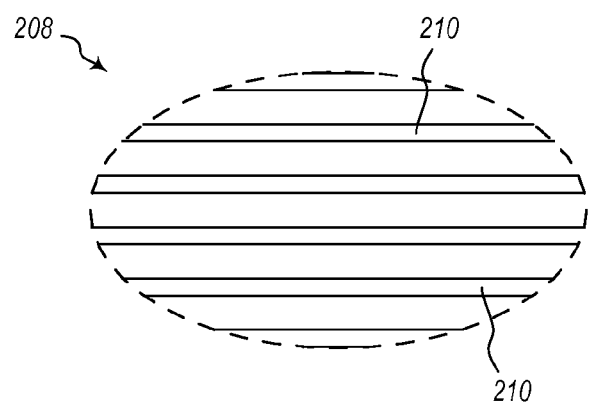

FIG. 2 is a conceptual drawing of an embodiment of a wearable display device 200. The wearable display device 200 is illustrated as a watch-type wearable device. The wearable display device 200 may include similar components as the head worn display device 100. For example, the wearable display device 200 may include one or more cameras 201, one or more displays 202, a processor 203, memory 204, other computing components, or combinations thereof, which may be in electronic communication with each other. The camera 201 may be used to track the location of one or more eyes and/or pupils of the viewer wearing the wearable display device 200. The display 202 may be used to emit light into one or more eyes of a viewer. As illustrated, the wearable display device 200 may include a single camera 201 and a single display 202.

As shown in FIG. 2-1, the wearable display device 200 may include at least one optical filter 208. The optical filter 208 may be used to deflect light from one or more displays 202 into one or more of the viewer's eyes and/or pupils. The optical filter 208 may be similar to the optical filter 108 show in FIG. 1-1. For example, a portion of the optical filter 208 shown in FIG. 2-1 illustrates that the optical filter 208 may include one or more films 210. The films 210 may be oriented such that the films 210 are substantially parallel to a light path from the display 202 to the viewer's eye (e.g., pupil). However, the distance from the display 202 to a viewer's pupil may be much farther than the distance from the displays 102-1, 102-2 in the head worn display device 100 to the viewer's pupil. For example, the distance from the head worn display device 100 to the viewer's pupil may be between 12 mm and 16 mm. The distance from the display 202 to a viewer's pupil may be between 1 meter (e.g., when the user's arm is fully extended) to centimeters (e.g., when held very close to the face).

At least one embodiment of a wearable display device 200 may reduce the amount of illumination power required to display images to a viewer. For example, one or more embodiments may reduce the illumination power to between 5% and 20% of a traditional display device.

Figure 3:
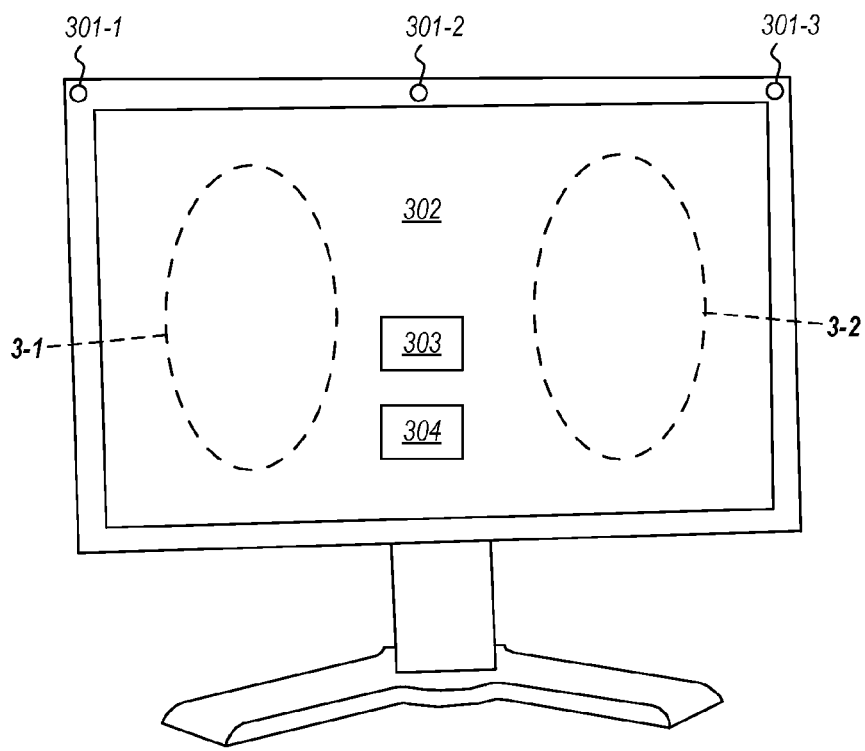
FIG. 3 is a conceptual drawing of an embodiment of a display device with a display.
Figures 1, 3:
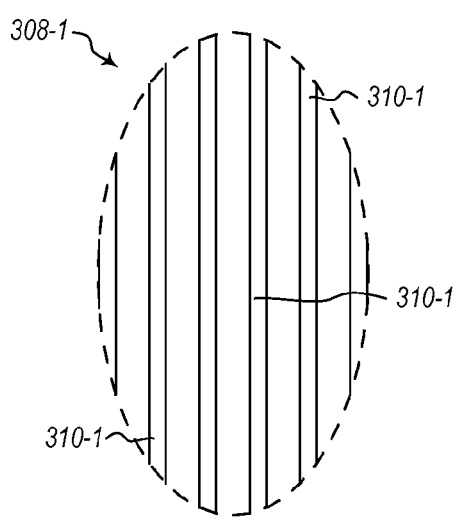
Figures 2, 3:
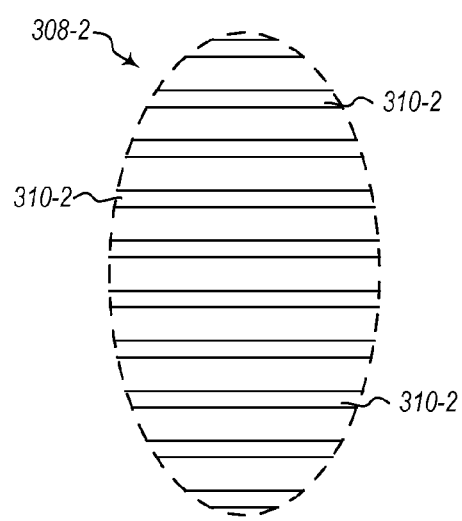

FIG. 3 is a conceptual drawing of an embodiment of a display device 300 with a display 302. Display device 300 may be a smart television, a laptop-type computing device, a monitor or other display connected to a desktop computing device, a monitor or other display connected to a gaming system and/or attached peripherals, or may be another display device.

The display device 300 may include similar components as the head worn display device 100 and the wearable display device 200. For example, the display device 300 may include one or more cameras (e.g., left camera 301-1, central camera 301-2, and right camera 301-3), one or more displays 302, a processor 303, memory 304, other computing components, or combinations thereof, which may be in electronic communication with each other. The left camera 301-1, central camera 301-2, and right camera 301-3 may be used to track the location of one or more eyes and/or pupils of one or more viewers of the display device 300. For example, the left camera 301-1 may be used to track the left eye of a viewer and the right camera 301-3 may be used to track the right eye of the viewer. The central camera 301-2 may be used to track the left and/or right eye of the viewer. The display 302 may be used to emit light into one or both eyes of a viewer (or to the eyes of multiple viewers). As illustrated, the display device 300 may include three cameras 301 (e.g., left camera 301-1, central camera 301-2, right camera 301-3) and a single display 302.

As shown in FIG. 3, the display device 300 may include at least one optical filter 308. The display device 300 may include a vertical optical filter 308-1 (as shown in FIG. 3-1) and/or a horizontal optical filter 308-2 (as shown in FIG. 3-2). The vertical and horizontal optical filters 308-1, 308-2 may be used to deflect light from one or more displays 302 into one or more of the viewer's eyes and/or pupils. The vertical and horizontal optical filters 308-1, 308-2 may be similar to the optical filters 108, 208 show in FIGS. 1-1 and 2-1. For example, a portion of the vertical optical filter 308-1 and/or a portion of horizontal optical filter 308-2 shown in FIGS. 3-1 and 3-2 illustrate that the optical filters 308-1, 308-2 may include one or more films 310-1, 310-2. The films 310-1, 310-2 may be oriented such that the films 310-1, 310-2 are substantially parallel to a light path from the display 302 to the viewer's eye (e.g., pupil).

At least one embodiment of a display device 300 may be capable of providing three-dimensional images to the viewer without the need for glasses or other filtering devices. Rather, the "left" image may be presented to only the left eye and the "right" image may be presented to only the right eye. For example, the left camera 301-1 and/or the central camera 301-2 may track the location of the viewer's left eye and the right camera 301-3 and/or the central camera 301-2 may track the location of the viewer's right eye. Then the left optical filters 308-1 may be positioned to direct light from the display 302 to the viewer's left eye and the right optical filters 308-2 may be positioned to direct light from the display 302 to the viewer's right eye. In another example, the left camera 301-1 and/or the central camera 301-2 may track a first viewer's eye or eyes (e.g., a viewer on the left) and the right camera 301-3 and/or the central camera 301-2 may track a second viewer's eye or eyes (e.g., a viewer on the right). Then the left optical filters 308-1 may be positioned to direct light from the display 302 to the first viewer's eye or eyes and the right optical filters 308-2 may be positioned to direct light from the display 302 to the second viewer's eye or eyes. In a further example, the cameras 302-1, 302-2, 302-3 may be used to track individual eyes of more than one viewer and the optical filters 308-1, 308-2 may be used to direct light to each user's individual eyes (e.g., direct a first image to the left eye and a second image to the right eye of each user) to produce a three-dimensional image for each user in their individual location.

Furthermore, at least one embodiment of a display device 300 may reduce the amount of illumination power required to display images to a viewer. For example, one or more embodiments may reduce the illumination power to between 5% and 20% of a traditional display device.

Figures 1, 4:
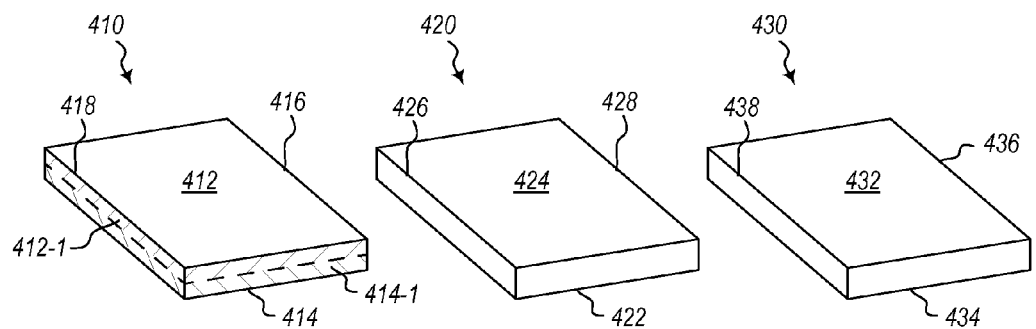
Figures 2, 4:
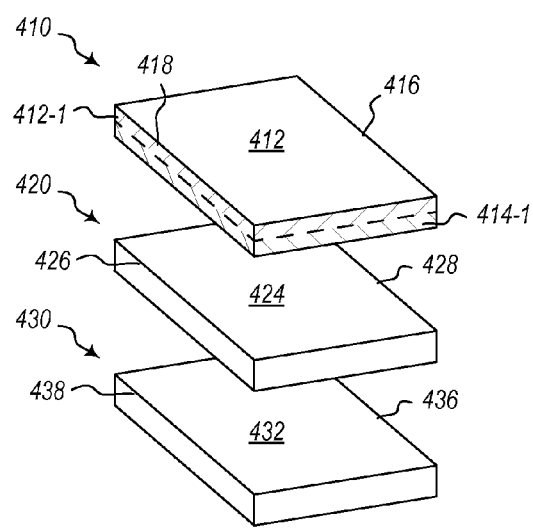

FIG. 4-1 is an isometric, planar view of an embodiment of an optical filter 400 having three separate films 410, 420, 430. FIG. 4-2 is an isometric view of the embodiment of an optical filter 400 shown in FIG. 4-1 in a stacked configuration. The optical filter 400 may be used in the head worn display device 100, the wearable display device 200, and the display device 300 shown in FIGS. 1-3. As described above, the first film 410, the second film 420, and the third film 430 may be used to direct and/or filter light.

The first film 410 includes an upper surface 412 and a lower surface 414. The terms "upper" and "lower" are used for ease of description and do not necessarily require that an upper surface be vertically above a lower surface as will be further described. The upper surface 412 may have a first index of refraction and the lower surface 414 may have a second index of refraction. In the present embodiment, the first index of refraction is different from the second index of refraction. The difference in indices of refraction may allow light to resonate within the optical filter 400 when the films 410, 420, 430 are stacked.

For example, the first index of refraction may be 1.5 and the second index of refraction may be 1.505. The range of indices of refraction may be from 1.47 to 1.68. The difference between the first index of refraction and the second index of refraction may be 0.005, 0.003, 0.001, or any value therebetween.

The difference in index of refraction may be due to, for example, a coating applied to the upper and/or lower surfaces 412, 414. In another example, the first film 410 may include a first layer 412-1 of material having a first index of refraction and a second layer 414-1 of material having a second index of refraction. In a further example, the first film 410 may include a first layer 412-1 and a second layer 414-1 and a coating on the upper and/or lower surfaces 412, 414. In embodiments with multiple layers, the layers may be extruded together or may be multiple sheets that are stacked on top of each other.

The second and third films 420, 430 are shown as each having a single layer. However, in other embodiments, the second and third films 420, 430 may include multiple layers and/or one or more coatings. For example, the first film 410 may include a first layer 412-1 and a second layer 414-1 without a coating, the second film 420 may include a single layer with a coating on one or more surfaces, and the third film 430 may include a single layer without a coating on any layer.

The first film 410 may include a first side 416 and a second side 418. The first side 416 is shown on the right side of the first film 410 and the second side 418 is shown on the left side of the first film 410 in both the planar configuration of FIG. 4-1 and the stacked configuration of FIG. 4-2. In other embodiments, the first side 416 and/or the second side 418 may be otherwise oriented. For example, the first side 416 may be located at the top of the first film 410 while the second side 418 is located on the left of the first film 410.

The first film 410 may be stacked with the second and third films 420, 430, as shown in FIG. 4-1. The first film 410 may be the upper film, the third film 430 may be the lower film, and the second film 420 may be the intermediate film. The second and third films 420, 430 may also include upper surfaces 422, 432 and lower surfaces 424, 434 and may include first sides 426, 436 and second sides 428, 438. The first side 416 of the first film 410 may be connected to the second side 428 of the second film 420 and the first side 426 of the second film 420 may be connected to the second side 438 of the third film 430. For example, the first film 410 may be connected to the second film 420 by an integral connection (e.g., as described in connection with FIGS. 5-1 and 5-2), by an adhesive (e.g., an ultraviolet cured adhesive), laser welding, other connection methods, or combinations thereof.

The upper surface 412 of the first film 410 may be the uppermost surface of the optical filter 400 in the stacked configuration. The lower surface 434 of the third film 430 may be the bottommost (e.g., lowest) surface of the optical filter 400 in the stacked configuration. The lower surface 414 of the first film 410 may be optically adjacent the lower surface 424 of the second film 420. Two surfaces being optically adjacent means that light passing from one surface to another is not altered (e.g., in its trajectory, frequency, phase, amplitude, other characteristic, or combinations thereof). In some embodiments, the lower surface 414 of the first film 410 may abut the lower surface 424 of the second film 420.

Surfaces that are optically adjacent or abut may have the same index of refraction. For example, the lower surface 414 of the first film 410 may have an index of refraction of 1.5 and the optically adjacent and/or abutting lower surface 424 of the second film 420 may have an index of refraction of 1.5. The upper surface 422 of the second film 420 may have an index of refraction of 1.505 and the optically adjacent and/or abutting upper surface 432 of the third surface 430 may have an index of refraction of 1.505.

In some embodiments, the first film 410 may be connected to the second film 420 at a single side and/or the second film 420 may be connected to the third film 430 at a single side. For example, the first side 416 of the first film 410 may be connected to the second side 428 of the second film, but not connected to any other side (e.g., including the first side 426) of the second film 420. As another example, the first side 426 of the second film 420 may be connected to the second side 438 of the third film, but not connected to any other side (e.g., including the first side 426) of the second film 430. In other words, the first film 410, the second film 420, and the third film 430 may be connected like an accordion (i.e., pleated) and may be expandable from a planar configuration (FIG. 4-1) to a stacked configuration (FIG. 4-2) and vice-versa.

Figures 1, 5:
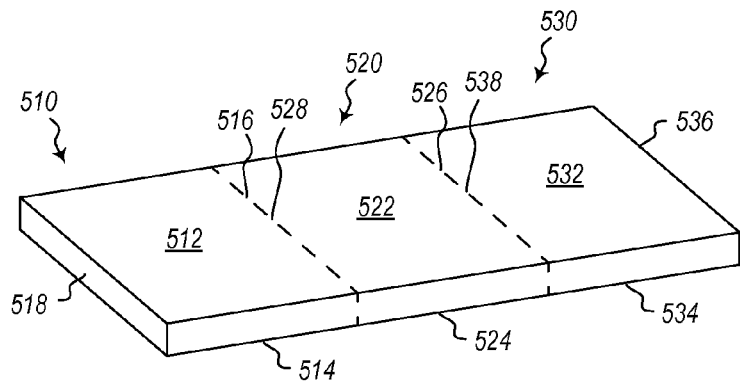
Figures 2, 5:
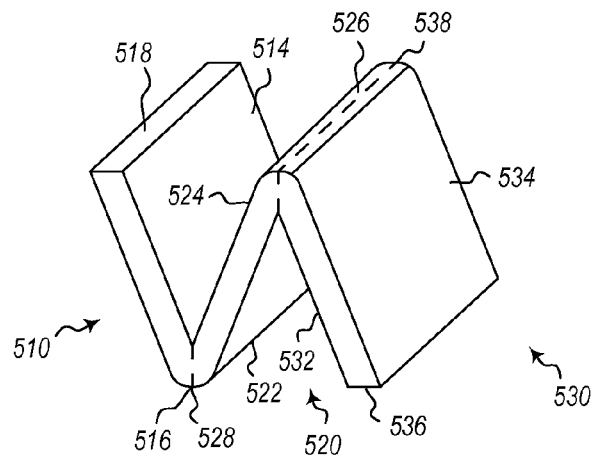

FIG. 5-1 is an isometric view of an embodiment of an optical filter 500 having three integrally formed films 510, 520, 530 in a planar configuration. FIG. 5-2 is an isometric view of the embodiment of an optical filter 500 of FIG. 5-1 in a folded configuration. The optical filter 500 may be used in the head worn display device 100, the wearable display device 200, and the display device 300 shown in FIGS. 1-3. The optical filter 500 of FIGS. 5-1 and 5-2 may be similar to the optical filter 400 described in connection with FIGS. 4-1 and 4-2. For example, the first film 510 may include an upper surface 512, a lower surface 514, a first side 516 and a second side 518. Although the first film 510 (as well as the second film 520 and the third film 530) is not shown with a first layer 412-1 and a second layer 414-1, any film described herein may include one or more layers. In another example, the second film 520 may include an upper surface 522, a lower surface 524, a first side 526 and a second side 528 and the third film 530 may include an upper surface 532, a lower surface 534, a first side 536 and a second side 538.

The various surfaces (e.g., the upper surfaces 512, 522, 532 and the lower surfaces 514, 524, 534) and/or the various layers (e.g., first layer 412-1, second layer 414-2, other layers, or combinations thereof) may have indices of refraction as described above. For example, the lower surface 514 of the first film 510, the lower surface 524 of the second film 520, the lower surface 534 of the third film 530, or combinations thereof may have a first index of refraction that may be substantially the same and the upper surface 522 of the second film 520, the upper surface 532 of the third film 530 may have a second index of refraction that may be substantially the same, but different from the first index of refraction.

The optical filter 500 of FIGS. 5-1 and 5-2 may differ from the optical filter 400 of FIGS. 4-1 and 4-2 as the first, second, and third films 510, 520, 530 may be integrally formed. In other words, the first, second, and third films 510, 520, 530 may be formed out of a single, monolithic film extending along the entire length (e.g., from the second side 518 of the first film 510 to the first side 536 of the third film 530) and the entire width (e.g., from the side near the bottom of the page to the non-shown side near the top of the page) of the optical filter 500. In some embodiments, the single film that forms the first, second, and third films 510, 520, 530 may not be monolithic through the entire thickness (e.g., from the upper surfaces 512, 522, 532 to the lower surfaces 514, 524, 534). For example, as described above, the film may include multiple layers. In other embodiments, the single film that forms the first, second, and third films 510, 520, 530 may be monolithic along the entire length (e.g., from the second side 518 of the first film 510 to the first side 536 of the third film 530), the entire width (e.g., from the side near the bottom of the page to the non-shown side near the top of the page), and through the entire thickness (e.g., from the upper surfaces 512, 522, 532 to the lower surfaces 514, 524, 534) of the optical filter 500.

The optical filter 500 is shown in FIG. 5-2 in a folded configuration. The first, second, and third films 510, 520, 530 may be formed during a folding process described below. Thus, although the first, second, and third films 510, 520, 530 are described as being separate, the first, second, and third films 510, 520, 530 may be used to describe the different layers of the optical filter 500 in the folded configuration. Thus, the first side 516 of the first film 510 is the same as the second side 528 of the second film 520, and the first side 526 of the second film 520 is the same as the first side 536 of the third film 530. The connection between the first film 510 and the second film 520 (as well as the second film 520 and the third film 530) may be an integral connection. Hence, in the folded configuration of FIG. 5-2, lower surfaces (e.g., lower surface 514 of the first film 510 and lower surface 524 of the second film 520) and upper surfaces (e.g., upper surface 522 of the second film 520 and upper surface 532 of the third film 530) may abut in the folded configuration. In other embodiments, other films and/or coatings may be applied to at least a portion of the upper or lower surfaces. However, the indices of refraction of the abutting and/or optically adjacent surfaces should be substantially the same in most embodiments.

Figure 6:
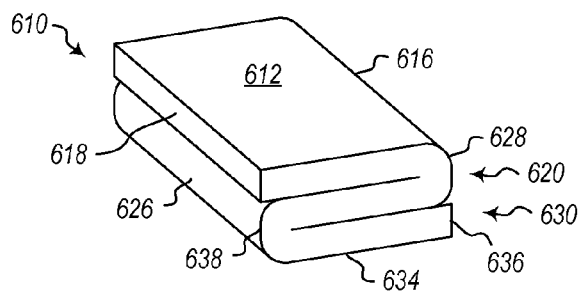
FIG. 6 is an isometric view of an embodiment of an optical filter with three films in a stacked configuration.

FIG. 6 is an isometric view of an embodiment of an optical filter 600 with three films 610, 620, 630 in a stacked configuration. The optical filter 600 may be similar to the optical filters 400, 600 described herein. For example, the first film 610 may include an upper surface 612, a lower surface 614, a first side 616 and a second side 618. Although the first film 610 (as well as the second film 620 and the third film 630) is not shown with a first layer 412-1 and a second layer 414-1, any film described herein may include one or more layers. In another example, the second film 620 may include an upper surface 622, a lower surface 624, a first side 626 and a second side 628 and the third film 630 may include an upper surface 632, a lower surface 634, a first side 636 and a second side 638.

The optical filter 600 may be the optical filter 500 shown in FIGS. 5-1 and 5-2. For example, the optical filter 600 may be the optical filter 500 shown in FIGS. 5-1 and 5-2 after the optical filter 500 is folded into the stacked configuration of FIG. 6. The optical filter 600 may be the optical filter 400 shown in FIGS. 4-1 and 4-2. For example, the optical filter 600 may be the optical filter 400 shown in FIGS. 4-1 and 4-2 with the first side 616 of the first film 610 connected to the second side 628 of the second film and the first side 626 of the second film 620 connected to the second side 638 of the third film 630.

Light may enter the optical filter 600 through any of the outermost surfaces of the optical filter 600. For example, light may enter through the upper surface 612 of the first film 610 (e.g., from the top of the page), the lower surface 634 of the third film 630 (e.g., from the bottom of the page), the second side 618 of the first film (e.g., from the left of the page), the first side 626 of the second film 620 (e.g., from the left of the page), the second side 638 of the third film (e.g., from the left of the page), the first side 616 of the first film 610 (e.g., from the right of the page), the second side 628 of the second film 620 (e.g., from the right of the page), the first side 636 of the third film 630 (e.g., from the right of the page), any of the bottom surfaces of the first, second, or third films 610, 620, 630 (e.g., from the above the front of the page), any of the top surfaces of the first, second, or third films 610, 620, 630 (e.g., through the page from the back side), or combinations thereof.

Light that passes from the sides of the optical filter 600 (e.g., the second side 618 of the first film, the first side 626 of the second film 620, the second side 638 of the third film, the first side 616 of the first film 610, the second side 628 of the second film 620, the first side 636 of the third film 630, any of the bottom surfaces of the first, second, or third films 610, 620, 630, any of the top surfaces of the first, second, or third films 610, 620, 630) may resonate within the optical filter 600. For example, light entering from the sides of the optical filter 600 may be directed as shown in the examples of FIGS. 1-3. Light that enters from the uppermost (e.g., upper surface 612 of the first film 610) and lowest surfaces (e.g., lower surface 634 of the third film 630) of the optical filter 600 may be diffracted as it passes through the optical filter 600.

The optical filter 600 may have a thickness from the upper surface 612 of the first film 610 to the lower surface 634 of the third film 630. The thickness of the optical filter 600 may be the sum of the thicknesses of each of the films 610, 620, 630. In one embodiment, the thickness of each film 610, 620, 630 may be 0.5 microns for a total thickness of 1.5 microns.

In one example, the length of the optical filter 600 may be 50 microns and the width may be about 3 millimeters. In other embodiments, the films may be thicker or thinner, longer or shorter, wider or less wide and/or may vary with respect to each other. However, in most embodiments, the indices of refraction should remain approximately the same for the upper surfaces and the lower surfaces respectively.

Figure 7:
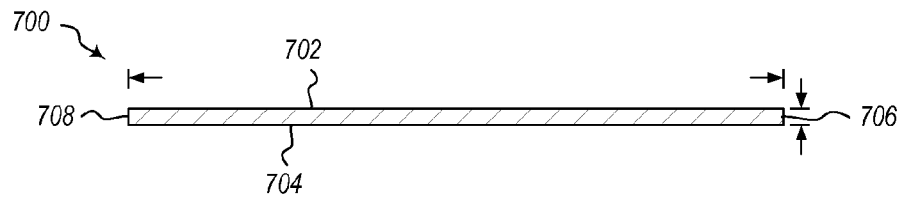
FIG. 7 is a side, cross-sectional view of an embodiment of a film.

The following description of FIGS. 7-12 includes examples of methods of manufacturing a film (e.g., a pre-optical filter) according to at least one embodiment described herein. FIG. 7 is a side, cross-sectional view of an embodiment of a film 700. The film may be made from a variety of materials. In some embodiments, the film may be made of photosensitive materials, polymers thereof, or combinations thereof. In other embodiments, the film 700 may be made of non-photosensitive materials, such as polyethelyne, acrylic, polystyrene and polycarbonate, polymers thereof, or combinations thereof. The film may be made of material that is transparent to visible light.

The film 700 may include an upper surface 702, a lower surface 702, a first side 706, and a second side 708. The film 700 includes a length (e.g., from the first side 706 to the second side 708) and a thickness (e.g., from the upper surface 702 to the lower surface 704). As with the embodiments of optical filters 400, 500, 600 described above, the film 700 may include one or more layers and/or one or more coatings. The upper surface 702 may have a first index of refraction and the lower surface 704 may have a second index of refraction that is different from the first index of refraction.

Figure 8:
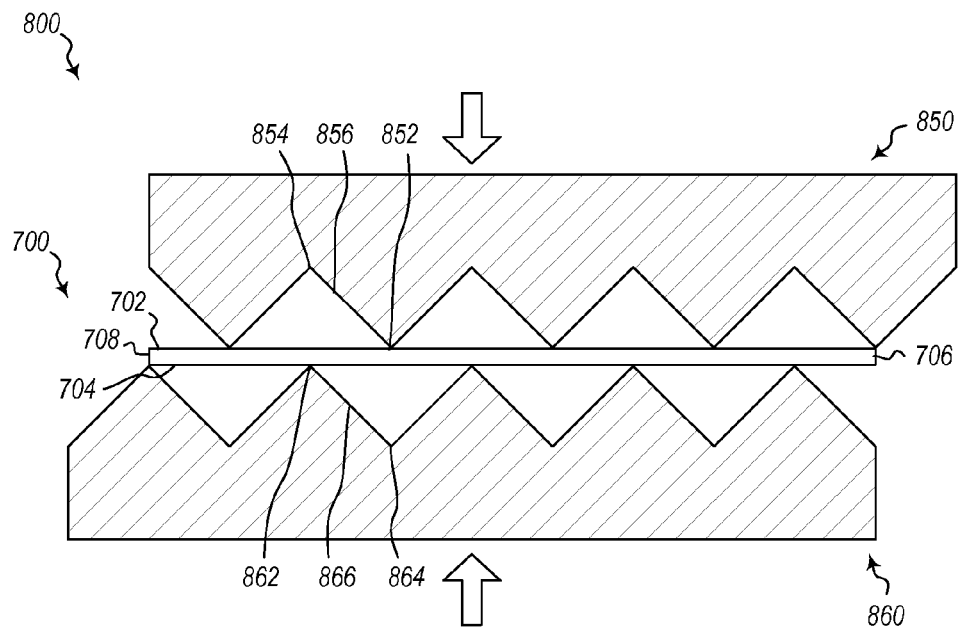
FIG. 8 is a side, cross-sectional view of a conceptual drawing of an embodiment an embossing device with the embodiment of a film of FIG. 7.

FIG. 8 is a side, cross-sectional view of a conceptual drawing of an embodiment of an embossing device 800 with the embodiment of a film 700 of FIG. 7. The embossing device 800 may include an upper embossing portion 850 and a lower embossing portion 860. The upper embossing portion 850 may include one or more teeth that have a peak 852 and a valley 854 with at least one embossing surface 856. The lower embossing portion 860 may include one or more teeth that have a peak 862 and a valley 864 with at least one embossing surface 866.

The upper embossing portion 850 and the lower embossing portion 860 are shown with five teeth each having respective peaks (e.g., peaks 852, 862), valleys (e.g., valleys 854, 864), and embossing surfaces (e.g., embossing surfaces 856, 866). In other embodiments, more or fewer teeth may be used. The peaks 852, 862 of the embossing portions 850, 860 may be sharp. For example, the peaks 852, 862 may be sufficiently sharp to at least partially penetrate the upper or lower surfaces 702, 704 of the film 700. In another example, the peaks 852, 862 are sufficiently sharp to reduce the thickness of the film at the point of engagement between the peaks 852, 862 and the valleys 854, 864.

The pitch (e.g., the distance between two adjacent teeth) between the teeth may be matched to a desired thickness (e.g., from the uppermost surface to the lowest surface) of the optical filter. For example, the pitch of the teeth may be the desired distance (e.g., for the optical filter 500 of FIG. 5-1 the distance is from the second side 518 of the first film 510 to the second side 538 of the third film 530) of the optical filter divided by the square root of two. In other embodiments, other pitches may be chosen. As shown, the pitch of all of the teeth in the upper embossing portion 850 is the same as the pitch of all of the teeth in the lower embossing portion 860. In other embodiments, the pitches of the teeth may vary between the upper embossing portion 850 and the lower embossing portion 860 and/or may vary between teeth in either or both of the upper embossing portion 850 and the lower embossing portion 860. However, in most embodiments, the pitch of the teeth on both the upper embossing portion 850 and the lower embossing portion 860 will be matched individually (e.g., each tooth on each embossing portion 850, 860) to their corresponding teeth in the other embossing portion (e.g., teeth on the upper embossing portion 850 match the pitch of teeth on the lower embossing portion 860).

The upper embossing portion 850 and the lower embossing portion 860 are aligned such that when the two embossing portions 850, 860 are moved together (e.g., by applying a force from the top and/or bottom as shown) the teeth engage with each other. The peaks 852 of the upper embossing portion 850 may abut the valleys 864 of the lower embossing portion 860 and the peaks 862 of the lower embossing portion 860 may abut the valleys 854 of the upper embossing portion 850. Thus, the length (e.g., for the optical filter 500 of FIG. 5 the length is from the second side 518 of the first film 510 to the first side 536 of the third film 530) of the final optical filter is approximately the same as the distance from a peak 852 to an adjacent valley 854 on the upper embossing portion 850 (or from a peak 862 to an adjacent valley 864 on the lower embossing portion 860).

In some embodiments, the upper embossing portion 850 and/or the lower embossing portion 860 may be Scotch optical lighting film that include one-dimensional prisms. As shown, multiple teeth are used at one time to emboss the film. In other embodiments, the upper embossing portion 850 may include a single tooth, the lower embossing portion 860 may include a pair of teeth, and the upper and lower embossing portions 850, 860 may emboss a first portion of the film and then move and emboss a second portion of the film. In further embodiments, a pair of rolling toothed mandrels may be used to emboss the films. It will be appreciated that there are many ways to emboss or fold the films.

Figure 9:
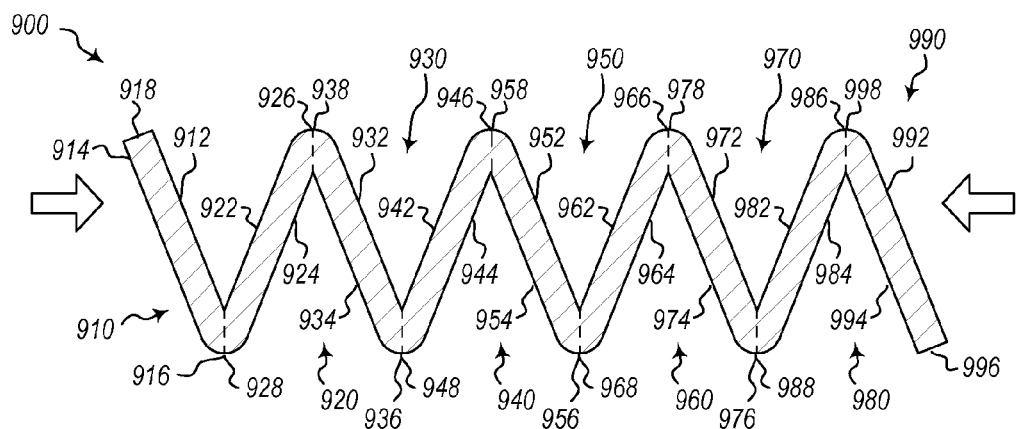
FIG. 9 is a side, cross-sectional view of the embodiment of a film in an embossed configuration.

As the teeth of the upper embossing portion 850 and the lower embossing portion 860 engage each other, they may emboss the film 700. Embossing the film 700 may plastically deform the film 700 to change its shape in a relaxed (e.g., where no external forces other than a normal force of gravity are applied) state. For example, FIG. 9 is a side, cross-sectional view of an embodiment of a film 900 in an embossed (e.g., folded) configuration. Embossing the film 700 may transition the film 700 from the planar configuration shown in FIG. 7 to the embossed configuration shown in FIG. 9. In other embodiments, the film 700 may be otherwise embossed. For example, the films may be manually or otherwise folded.

Referring to FIG. 8 and FIG. 9, as the teeth emboss the film 700, films 910, 920, 930, 940, 950, 960, 970, 980, 990 may be formed. For example, as labeled peak 852 approaches labeled valley 864, the film 700 is deformed. Where peak 852 engages the film 700 against valley 864 a first side 936 of a third film 930 (and a second side 948 of a fourth film 940) is formed. An upper surface 932 of the third film 930 abuts the embossing surface 856 of the upper embossing portion 850 and a lower surface 934 of the third film 930 abuts the embossing surface 866 of the lower embossing portion 860. The other films (e.g., films 910, 920, 940, 950, 960, 970, 980, 990) may interact similarly with the upper and lower embossing portions 850, 860. Thus, the film 900 may include first film 910, second film 920, third film 930, fourth film 940, etc. Each film may include an upper surface (e.g., upper surfaces 912, 922, 932, 942, 952, 962, 972, 982, 992), a lower surface (e.g., lower surfaces 914, 924, 934, 944, 954, 964, 974, 984, 994), a first side (e.g., first sides 916, 926, 936, 946, 956, 966, 976, 986, 996), and a second side (e.g., first sides 918, 928, 938, 948, 958, 968, 978, 988, 998). The upper surfaces may have a first index of refraction and the lower surfaces may have a second index of refraction that is different from the first index of refraction. Although FIG. 9 only illustrates nine films (e.g., films 910, 920, 940, 950, 960, 970, 980, 990), in other embodiments more or fewer films may be included.

The film 900 may have a thickness from the upper surface 912 of the first film 910 to the lower surface 994 of the ninth film 990. The thickness of the film 900 may be the sum of the thicknesses of each of the films 910, 920, 930, 940, 950, 960, 970, 980, 990. In one embodiment, the thickness of each film may be 0.5 microns for a total thickness of 4.5 microns.

The film 900 may have a length from the second side 918 of the first film and/or the first side 926 of the second film 920 and the second side 938 of the third film to the first side 936 of the third film 930 and/or the first side 916 of the first film and the second side 928 of the second film 920. In one example, the length of the film 900 may be 50 microns.

The film 900 may have a width from any of the top surfaces of the first, second, or third films 910, 920, 930 (e.g., through the page from the back side) to any of the bottom surfaces of the first, second, or third films 910, 920, 930 (e.g., from the above the front of the page). In one example, the width may be about 3 millimeters.

In other embodiments, the films may be thicker or thinner, longer or shorter, wider or less wide and/or may vary with respect to each other. However, in most embodiments, the indices of refraction should remain approximately the same for the upper surfaces and the lower surfaces respectively.

Thicknesses of the films may vary from 20 microns to 1 meter. The total number of films may vary from three to many thousands of films. The width of the films may vary from 20 microns to 1 meter. The length of the films may vary from 3 microns to 100 microns. In one example embodiment, an optical filter may include one-hundred films that are each 0.5 microns thick for a total of 50 microns of thickness, with a width of 3 millimeters, and a length of 50 microns. In an example that may be incorporated into the head worn display device 100 shown in FIG. 1, the length may be 50 millimeters, the width may be 30 millimeters, and the thickness may be 50 microns (with a film thickness of 0.5 microns for a total of one-hundred films).

As shown in FIG. 9, after the film 900 has been embossed (or folded), one or more forces may be applied to the film to cause the upper surfaces (e.g., upper surfaces 912, 922, 932, 942, 952, 962, 972, 982) to abut each other (e.g., upper surface 912 to abut upper surface 922 and upper surface 972 to abut upper surface 982) and the lower surfaces (e.g., lower surfaces 924, 934, 944, 954, 964, 974, 984, 994) to abut each other (e.g., lower surface 994 to abut lower surface 984 and lower surface 924 to abut lower surface 934). As shown in FIG. 9, a first (left) force and a second (right) force oppose each other to cause the upper surfaces and the lower surfaces to abut each other.

Figure 10:
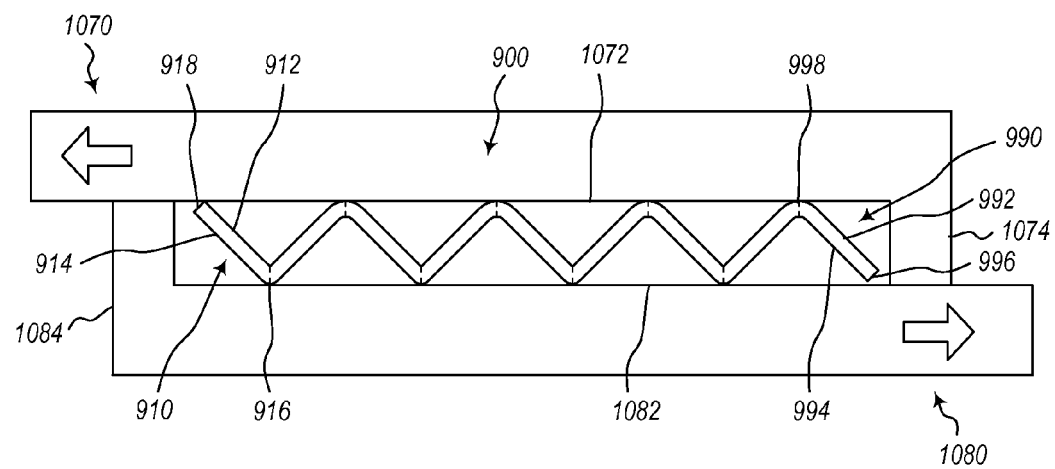
FIG. 10 is a side, cross-sectional view of an embodiment of a stacking device with the embodiment of a film of FIG. 9.

FIG. 10 is a side, cross-sectional view of an embodiment of a stacking device with the embodiment of a film 900 of FIG. 9. The stacking device may include an upper stacking device 1070 and a lower stacking device 1080. The upper stacking device 1070 may include a side surface 1072 that engages with a portion of the sides (e.g., second sides 918, 938, 958, 978, 998 and first sides 926, 946, 966, 986) of the film 900. The lower stacking device 1080 may include a side surface 1082 that engages with a portion of the sides (e.g., first sides 916, 936, 956, 976, 996 and second sides 928, 948, 968, 988) of the film 900. The upper stacking device 1080 may include an upper surface 1074 that engages with the uppermost surface (e.g., upper surface 992 of ninth film 990). The lower stacking device 1090 may include a lower surface 1084 that engages with the lowest surface (e.g., lower surface 914 of first film 910). The side surfaces 1072, 1082 may cooperate to retain the film 900 within the stacking device.

Figure 11:
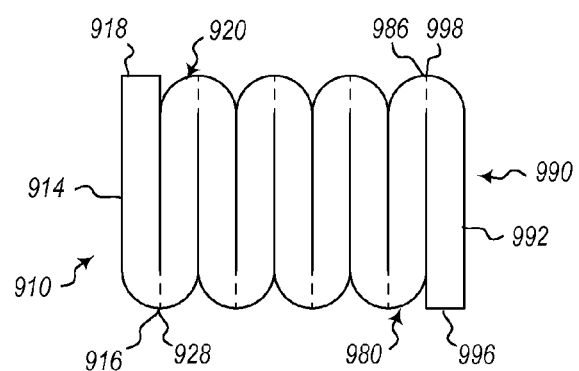
FIG. 11 is a side, cross-sectional view of the embodiment of a film of FIG. 9 in a stacked configuration.

To transition the film 900 from the embossed or folded configuration shown in FIG. 9 toward the stacked configuration shown in FIG. 11, the upper surface 1074 of the upper stacking device 1070 may move toward the lower surface 1084 of the lower stacking device 1080 or vice versa. In the illustrated embodiment both the upper stacking device 1070 and the lower stacking device 1080 move toward each other (e.g., the upper surface 1074 and the lower surface 1084 move toward each other).

Once the film 900 is in the stacked configuration of FIG. 11, the film 900 becomes an optical filter that can be used as described herein. In order to retain the film 900 in the stacked configuration, ultraviolet cured glue may be applied between the upper and lower surfaces of the film 900 before transitioning to the stacked configuration and then using ultraviolet curing on the glue to retain the film in the stacked configuration. The ultraviolet cured glue may be considered a coating for the purposes of this disclosure. Thus, in most embodiments the ultraviolet cured glue should either be optically transparent or should be selected such that the final indices of refraction of the upper and lower surfaces are not inadvertently changed. In other examples, the film 900 may be retained in the stacked configuration by a fixture or other device that maintains the film 900 in the stacked configuration.

Figure 12:
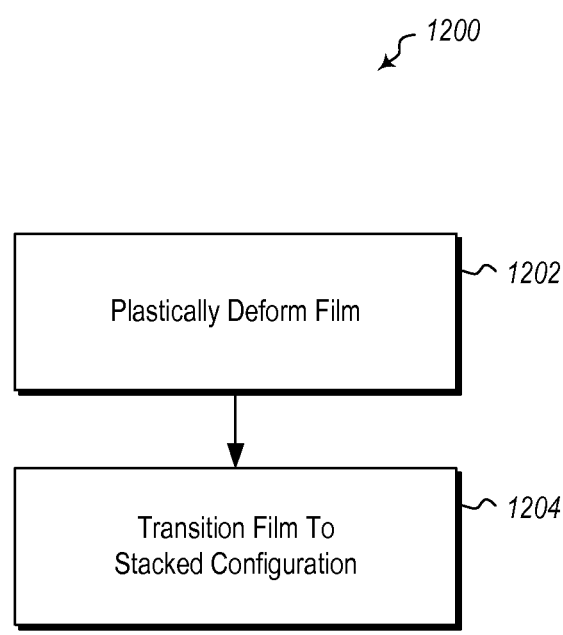
FIG. 12 is a block diagram of a method of manufacturing an optical filter.

FIG. 12 is a block diagram of a method 1200 of manufacturing an optical filter. In a first act, a film (e.g., film 700) may be plastically deformed 1202. Plastically deforming 1202 the film may be accomplished as described above. For example, the film may be embossed using an embossing tool, folded, otherwise deformed, or combinations thereof.

The film may be transitioned 1204 to a stacked configuration. Transitioning 1204 the film to the stacked configuration may be accomplished as described above. For example, one or more stacking devices (e.g., upper and lower stacking devices 1070, 1080) may be used.

The preceding discussion refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

These described embodiments herein are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

Elements of various embodiments of the present disclosure are introduced above. Use of the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. It should be understood that any directions or reference frames in the preceding description are merely relative directions or movements. For example, any references to "front" and "back," "upper" and "lower," and "uppermost" and "lowest" are merely descriptive of the relative position or location of the related elements.

Where doing so would not conflict with a description of a Figure herein, any act, component, information, or other element described herein may replace or be combined with other act, component, information, or other element described in conjunction with a description of any other Figure described herein. Thus, the descriptions any Figures herein is hereby incorporated by reference into the description of any other Figure herein. For example, any optical filter 400, 500, 600 or film 700, 900 described in connection with FIGS. 4-11 may be incorporated into any optical filter 108, 208, 308-1, 308-2 described in connection with Figures 1-3. Such that, unless expressly indicated otherwise, any act, component, information, or other element described herein may be claimed in conjunction with any other act, component, information, or other element described herein and such potential combination is hereby explicitly supported by this incorporation.

Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. An optical filter for diffracting light, comprising:
   a first film having an upper surface, a lower surface, a first side, and a second side;
   a second film having an upper surface, a lower surface, a first side, and a second side; and
   a third film having an upper surface, a lower surface, a first side, and a second side, at least an edge of the first side of the first film being connected to at least an edge of the second side of the second film, at least an edge of the first side of the second film being connected to at least an edge of the second side of the third film, the lower surface of the first film being optically adjacent to the lower surface of the second film, and the upper surface of the second film being optically adjacent to the upper surface of the third film, such that the first film, second film, and third film functions as a Bragg optical element.

2. The optical filter of claim 1, wherein the first film is only connected to the second film at a single side and the second film is only connected to the third film at a different single side.

3. The optical filter of claim 1, wherein the first side of the first film is integrally formed with the second side of the second film and the first side of the second film is integrally formed with the second side of the third film.

4. The optical filter of claim 1, wherein the upper surface of the first film has a first index of refraction and the lower surface of the first film has a second index of refraction, the first index of refraction being different than the second index of refraction.

5. The optical filter of claim 1, wherein the first film, the second film, and the third film each have a first layer and a second layer.

6. The optical filter of claim 5, wherein the first layer is separate from but directly adjacent to the second layer of each film.

7. The optical filter of claim 5, wherein the first layer and the second layer of each film are integrally formed.

8. The optical filter of claim 1, further comprising a fourth film having an upper surface and a lower surface.

9. The optical filter of claim 1, wherein a distance from the upper surface of the first film to the lower surface of the third film is between 1.5 to 50 microns.

10. The optical filter of claim 1, wherein the first film, the second film, and the third film are not photosensitive.

11. The optical filter of claim 10, wherein the first film, the second film, and the third film include polyethylene.

12. The optical filter of claim 1, wherein the first film, the second film, and the third film are transparent to visible light.

13. An optical filter for diffracting light, comprising:
a first film having an upper surface, a lower surface, a first side, and a second side;
a second film having an upper surface, a lower surface, a first side, and a second side; and
a third film having an upper surface, a lower surface, a first side, and a second side, at least an edge of the first side of the first film being connected to at least an edge of the second side of the second film, at least an edge of the first side of the second film being connected to at least an edge of the second side of the third film, the lower surface of the first film abutting the lower surface of the second film, the upper surface of the second film abutting the upper surface of the third film, the upper surface of the first film having a first index of refraction and the lower surface of the first film having a second index of refraction, the first index of refraction being different than the second index of refraction such that the first film, second film, and third film functions as a Bragg diffractor.

14. The optical filter of claim 13, wherein the first film, the second film, and the third film each have a first layer and a second layer.

15. The optical filter of claim 13, further comprising a fourth film having an upper surface and a lower surface.

16. The optical filter of claim 13, further comprising a fifth film through a one-hundredth film, each film having an upper surface and a lower surface.

17. A method of manufacturing an optical filter, comprising:
plastically deforming a film from a planar configuration to a folded configuration, the film having an upper surface and a lower surface, the upper surface having a first index of refraction and the lower surface having a second index of refraction, the first index of refraction being different than the second index of refraction; and
transitioning the film from the folded configuration to a stacked configuration where a planar area of one or more of the upper surfaces of the film abut another planar area of the one or more upper surfaces of the film and a planar area of one or more of the lower surfaces of the film abut another planar area of the one or more lower surfaces of the film.

18. The method of claim 17, wherein plastically deforming the film comprises using an embossing device to plastically deform the film into multiple films having upper and lower surfaces.

19. The method of claim 18, wherein the embossing device includes a plurality of teeth and wherein a pitch of the teeth is selected to match a desired length of the optical filter.

20. The method of claim 17, the film being formed of a first layer and a second layer integrally formed with one another.

* * * * *